(12) United States Patent (10) Patent No.: US 7,739,622 B2
DeLine et al. (45) Date of Patent: Jun. 15, 2010

(54) DYNAMIC THUMBNAILS FOR DOCUMENT NAVIGATION

(75) Inventors: Robert DeLine, Seattle, WA (US); Mary Czerwinski, Woodinville, WA (US); Brian R Meyers, Issaquah, WA (US); Gina Venolia, Bellevue, WA (US); Steven M Drucker, Bellevue, WA (US); George G Robertson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 362 days.

(21) Appl. No.: 11/553,986

(22) Filed: Oct. 27, 2006

(65) Prior Publication Data

US 2008/0104535 A1 May 1, 2008

(51) Int. Cl.
*G06F 3/048* (2006.01)

(52) U.S. Cl. .................. 715/835; 715/764; 715/777; 715/815; 715/838; 345/660; 345/670; 345/668

(58) Field of Classification Search .................. 715/854, 715/838, 835, 764, 777, 801, 815; 345/838, 345/835, 660, 670
See application file for complete search history.

(56) References Cited

U.S. PATENT DOCUMENTS

| | | | | |
|---|---|---|---|---|
| 5,793,369 A | * | 8/1998 | Atkins et al. | 715/787 |
| 6,125,375 A | * | 9/2000 | Atkins et al. | 715/207 |
| 6,182,090 B1 | * | 1/2001 | Peairs | 715/209 |
| 6,262,732 B1 | * | 7/2001 | Coleman et al. | 715/835 |
| 7,071,934 B1 | * | 7/2006 | Faoro et al. | 715/229 |
| 2001/0028368 A1 | * | 10/2001 | Swartz et al. | 345/835 |
| 2002/0021308 A1 | * | 2/2002 | White et al. | 345/800 |
| 2003/0030678 A1 | * | 2/2003 | Rosenholtz et al. | 345/838 |

* cited by examiner

*Primary Examiner*—Boris Pesin
*Assistant Examiner*—Shen Shiau
(74) *Attorney, Agent, or Firm*—Lyon & Harr, LLP; Mark A. Watson

(57) ABSTRACT

A "Spatial Navigator" provides a document navigation environment that leverages user spatial memory. Graphical thumbnail-type representations ("thumbnails") provide scaled versions of entire documents. Changes to documents are immediately reflected in corresponding thumbnails. Similarly, document search results are highlighted in corresponding thumbnails. One or more dynamic document selection windows present arrangements of a plurality of these thumbnails for user selection and interaction. Each dynamic document selection window provides real-time inter-file navigation by allowing user selection and opening of documents, or any location or portion of a document, through user interaction with the corresponding thumbnail. Once a document is opened, intra-file navigation is enhanced by providing another scaled version of the entire document in a dynamic scrollbar adjacent to a primary document editing/viewing window. Selection of any point within this scrollbar-based thumbnail causes an immediate jump to the corresponding document location in the primary document editing/viewing window.

20 Claims, 6 Drawing Sheets

DYNAMIC THUMBNAILS FOR DOCUMENT NAVIGATION

BACKGROUND

1. Technical Field

The invention is related to document navigation, and in particular, to a technique for providing a plurality of dynamic real-time graphical representations of documents for selection and navigation of those documents.

2. Related Art

Users accessing documents, such as a large text document or an application source code file, typically spend a large fraction of their time navigating around the document looking for particular parts of the document. In general, such navigation is accomplished using any of several different techniques. Examples of these navigation techniques include: opening, switching between, and scrolling within tabbed documents; clicking on (selecting) items or documents in hierarchical overviews; clicking on source code entities (e.g., hyperlinks to entity definitions); and issuing textual queries or structural queries (find instances, find definitions, find callers, find all references, etc.), then jumping to the query results.

Navigation time problems have been observed in a number of software productivity studies. For example, in one study involving software developers modifying a 500-line computer program, the software developers spent an average of 35% of their task time navigating the source code, looking for particular elements of that code to modify. A similar study involving modification of a 3000-line computer program found that time spent in navigating the code played a large role in the participants' poor task completion rates. In both studies, experienced programmers had difficulty navigating around programs of very modest size. It is expected that this type of navigation problem will consume greater amounts of time as the size of the document increases, and as multiple related or unrelated documents are navigated.

One reason why conventional document navigation techniques are inefficient is that typical user interface (UI) mechanisms require some knowledge of symbol or file names. For example, to open a file requires knowing its name; to click on a computer program method in a class overview requires knowing the name of the method, its containing class and the class's containing namespace; to find an object using a search requires knowing the name of the sought object or a nearby object. The number of symbols in even a modest computer program can quickly overwhelm a developer's working memory, causing confusion and false navigation steps.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Spatial Navigator" provides a document selection and/or editing environment that leverages user spatial memory for document navigation. Graphically scaled representations of documents are scaled in proportion to the corresponding document. In other words, each scaled graphical representation of a document represents a scaled version of an entire document. In one embodiment, scaling of these graphical representations is consistent such that the size of each graphical representation relative to the size of each other graphical representation visually indicates both the length of the document, and the width of the longest line in the document.

In general, the Spatial Navigator provides one or more dynamic document selection windows, each of which presents the user with an arrangement of a plurality of these graphical representations of documents for user selection and interaction. This idea is generally referred to herein as a "desktop thumbnail." Specifically, each dynamic document selection window provides real-time inter-file navigation by allowing the user to select any document, or any location or portion of any corresponding document, for immediate access to the corresponding content by simply selecting any point of any of the desktop thumbnails.

In a related embodiment, once any document has been opened, intra-file navigation is further enhanced by providing a scaled graphical representation of the entire document in a dynamic scrollbar adjacent to a primary document editing/viewing window. This idea is generally referred to herein as a "scrollbar thumbnail." Selection of any point within the scrollbar thumbnail causes an immediate jump to the corresponding document location in the primary document editing/viewing window. In a closely related embodiment, rather than placing the scrollbar thumbnail adjacent to the primary document editing/viewing window, the scrollbar thumbnail is rendered as a visible background image within the same window as the open document. This embodiment is advantageous in that it provides the user with the utility of the scrollbar thumbnail, as described herein, without giving up any additional screen area.

In both cases, both the desktop thumbnails and the scrollbar thumbnails provide the user with scaled representations of documents that allow the user to identify points of interest within that document by using spatial memory for navigation. This spatial memory-based navigation is advantageous in that it reduces document selection and navigation times when searching, navigating, and/or editing documents by illustrating visual patterns in documents that are identifiable via the user's spatial memory of patterns in the original document. For example, when a particular document is code being rendered by an integrated development environment (IDE), such as a code editor, indentations, bookmarks, and/or breakpoints in the document are easily recognizable in the scaled versions of the original document provided via the desktop thumbnails and/or scrollbar thumbnails.

Furthermore, in one embodiment, either or both the desktop and scrollbar thumbnails are live in the sense that any changes made to the corresponding documents are immediately reflected in the corresponding graphical representation of that document. In related embodiments, text or images highlighted in a document are also highlighted in the corresponding graphical representation of that document. For example, if the user performs a keyword search relative to one or more documents, instances of the keyword in any of the searched documents will be highlighted in the corresponding graphical representation. In various embodiments, this highlighting takes the form of using color or shading to highlight instances of the keyword, and/or increasing the size of instances of the keyword within the corresponding graphical representations.

One advantage of this highlighting with respect to the desktop thumbnails is that the user can immediately see relative locations of every instance of searched items within every document represented by desktop thumbnails. Further, since selection of any portion of a desktop thumbnail will provide immediate access to the corresponding content, the user can immediately access any desired specific instances of the identified keyword (or other searched item) within any corresponding document.

Similarly, with respect to the scrollbar thumbnails, since selection of any point within the scrollbar thumbnail causes an immediate jump to the corresponding document location in the primary document editing/viewing window, selection of any highlighted search results will cause an immediate jump to the corresponding location within that document.

In view of the above summary, it is clear that the Spatial Navigator described herein provides a unique system and method for reducing document selection and navigation times. In addition to the just described benefits, other advantages of the Spatial Navigator will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION

In the following description of various embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
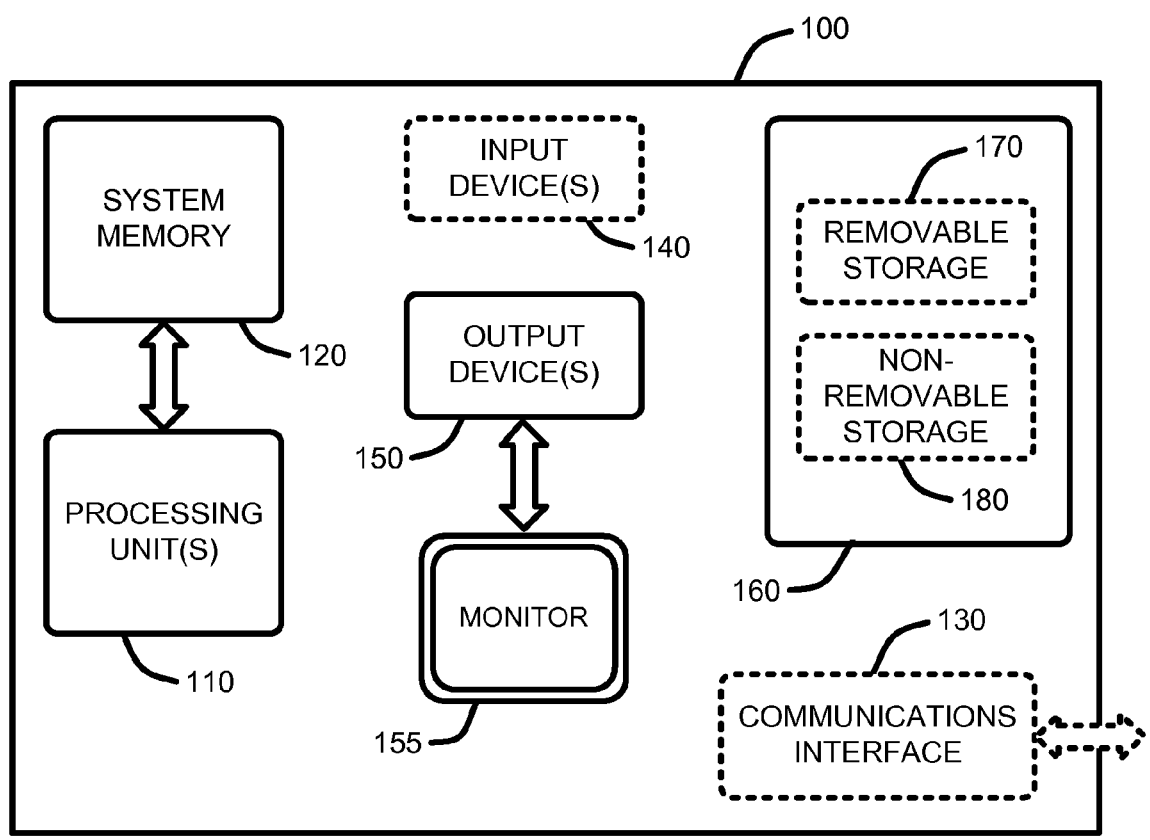
FIG. 1 is a general system diagram depicting a general-purpose computing device constituting an exemplary system for implementing a Spatial Navigator, as described herein.

1.0 Exemplary Operating Environment:

FIG. 1 illustrates an example of a simplified computing environment on which various embodiments and elements of a "Spatial Navigator," as described herein, may be implemented. It should be noted that any boxes that are represented by broken or dashed lines in FIG. 1 represent alternate embodiments of the simplified computing environment, as described herein, and that any or all of these alternate embodiments, as described below, may be used in combination with other alternate embodiments that are described throughout this document.

At a minimum, to enable a computing device to implement the "Spatial Navigator" (as described in further detail below), the computing device 100 must have some minimum computational capability and either a wired or wireless communications interface 130 for receiving and/or sending data to/from the computing device, or a removable and/or non-removable data storage for retrieving and/or displaying that data.

In general, FIG. 1 illustrates an exemplary general computing system 100. The computing system 100 is only one example of a suitable computing environment and is not intended to suggest any limitation as to the scope of use or functionality of the invention. Neither should the computing system 100 be interpreted as having any dependency or requirement relating to any one or combination of components illustrated in the exemplary computing system 100.

In fact, the invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

For example, with reference to FIG. 1, an exemplary system for implementing the invention includes a general-purpose computing device in the form of computing system 100. Components of the computing system 100 may include, but are not limited to, one or more processing units 110, a system memory 120, a communications interface 130, one or more input and/or output devices, 140 and 150, respectively, and data storage 160 that is removable and/or non-removable, 170 and 180, respectively.

The communications interface 130 is generally used for connecting the computing device 100 to other devices via any conventional interface or bus structures, such as, for example, a parallel port, a game port, a universal serial bus (USB), an IEEE 1394 interface, a Bluetooth™ wireless interface, an IEEE 802.11 wireless interface, etc. Such interfaces 130 are generally used to store or transfer information or program modules to or from the computing device 100.

The input devices 140 generally include devices such as a keyboard and pointing device, commonly referred to as a mouse, trackball, or touch pad. Such input devices may also include other devices such as a joystick, game pad, satellite dish, scanner, radio receiver, and a television or broadcast video receiver, or the like. Conventional output devices 150 include elements such as a computer monitor 155 or other display devices, audio output devices, etc. Other input 140 and output 150 devices may include speech or audio input devices, such as a microphone or a microphone array, loudspeakers or other sound output device, etc.

The data storage 160 of computing device 100 typically includes a variety of computer readable storage media. Computer readable storage media can be any available media that can be accessed by computing device 100 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, hard disk drives, or other magnetic storage devices. Computer storage media also includes any other medium or communications media which can be used to store, transfer, or execute the desired information or program modules, and which can be accessed by the computing device 100. Communication media typically embodies computer readable instructions, data structures, program modules or other data provided via any conventional information delivery media or system.

The computing device 100 may also operate in a networked environment using logical connections to one or more remote computers, including, for example, a personal computer, a server, a router, a network PC, a peer device, or other common network node, and typically includes many or all of the elements described above relative to the computing device 100.

The exemplary operating environments having now been discussed, the remaining part of this description will be devoted to a discussion of the program modules and processes embodying various embodiments of the "Spatial Navigator."

2.0 Introduction:

A "Spatial Navigator," as described herein provides a document selection and/or editing environment that leverages user spatial memory for document navigation. In general, this spatial navigation is enabled by providing a plurality of interactive scaled graphical representations of documents that allow the user to visually identify and select points of interest within one or more documents by selecting points within a corresponding a scaled graphical representation of an entire document provided in a "document selection window." The scaled graphical representations provided in the document selection window are referred to herein as "desktop thumbnails."

In a related embodiment, once any document has been opened another scaled graphical representation of the entire document is provided in a dynamic scrollbar adjacent to a primary document editing/viewing window. This type of scaled graphical representation is referred to herein as a "scrollbar thumbnail." In a closely related embodiment, rather than placing the scrollbar thumbnail adjacent to the primary document editing/viewing window, the scrollbar thumbnail is rendered as a visible background image within the same window as the open document. This embodiment is advantageous in that it provides the user with all of the utility of the scrollbar thumbnail, as described herein, without giving up any additional screen area. In either case, the scrollbar thumbnail operates in the same manner. Consequently, the background rendering embodiment of the scrollbar thumbnail will not be separately described in further detail herein.

The spatial memory-based navigation enabled by the Spatial Navigator is advantageous in that it reduces document selection and navigation times when searching, navigating, and/or editing documents by illustrating visual patterns in documents that are identifiable via the user's spatial memory of patterns in the original document. For example, when a particular document is code being rendered by an integrated development environment (IDE), such as a code editor, indentations, bookmarks, and/or breakpoints in the document are easily recognizable in the scaled versions of the original document provided via the desktop thumbnails and/or scrollbar thumbnails. Further, by providing a collection of these graphical representations of entire documents arrayed within a document selection window, the user's spatial memory of the location of particular documents is also advantageously leveraged to reduce document selection times.

2.1 System Overview:

As noted above, the Spatial Navigator described herein provides a unique navigation system and method for reducing document selection and navigation times. In general, for each of a plurality of documents, the Spatial Navigator creates a graphically scaled representation of those documents. Each of these graphically scaled representations is then displayed within one or more dynamic "document selection windows" for user selection and interaction. As noted above, scaled graphical representation of a document displayed within a document selection window is generally referred to herein as a "desktop thumbnail."

Each dynamic document selection window provides real-time inter-file navigation by allowing the user to select any point of any of the desktop thumbnails which will update the editing focus to the corresponding position in the original document. In one embodiment, these desktop thumbnails are scaled in proportion to a length and/or width of the contents of the corresponding document when being displayed in the document selection window. Consequently, scaling of the desktop thumbnails is consistent such that the size of each desktop thumbnail relative to the size of each other desktop thumbnail visually indicates both the length of the document, and the width of the longest line in the document.

In another embodiment, once any document has been opened via user selection of a desktop thumbnail, intra-file navigation is further enhanced by providing a scaled graphical representation of the entire opened document within a dynamic scrollbar adjacent to a primary document editing/viewing window. This idea is generally referred to herein as a "scrollbar thumbnail." Selection of any point within the scrollbar thumbnail causes an immediate jump to the corresponding document location in the primary document editing/viewing window.

As noted above, both the desktop thumbnails and the scrollbar thumbnails provide the user with scaled representations of documents that allow the user to identify points of interest within that document by using spatial memory for navigation. Furthermore, in one embodiment, either or both the desktop and scrollbar thumbnails are live in the sense that any changes made to the corresponding documents are immediately reflected in the corresponding desktop or scrollbar thumbnail of that document.

In additional embodiments, text or images highlighted in a document are also highlighted in the corresponding desktop or scrollbar thumbnail representation of that document. For example, if the user performs a keyword search relative to one or more documents, instances of the keyword in any of the searched documents will be highlighted in the corresponding desktop and/or scrollbar thumbnails. In various embodiments, this highlighting takes the form of using color or shading to highlight instances of the keyword, and/or increasing the size of instances of the keyword within the corresponding desktop and/or scrollbar thumbnails.

One advantage of this highlighting with respect to the desktop thumbnails is that the user can immediately see relative locations of every instance of searched items within every document represented by desktop thumbnails. Further, since selection of any portion of a desktop thumbnail will provide immediate access to the corresponding content, the user can immediately access any desired specific instances of the identified keyword (or other searched item) within any corresponding document.

Similarly, with respect to the scrollbar thumbnails, since selection of any point within the scrollbar thumbnail causes an immediate jump to the corresponding document location in the primary document editing/viewing window, selection of any highlighted search results will cause an immediate jump to the corresponding location within that document.

Figure 2:
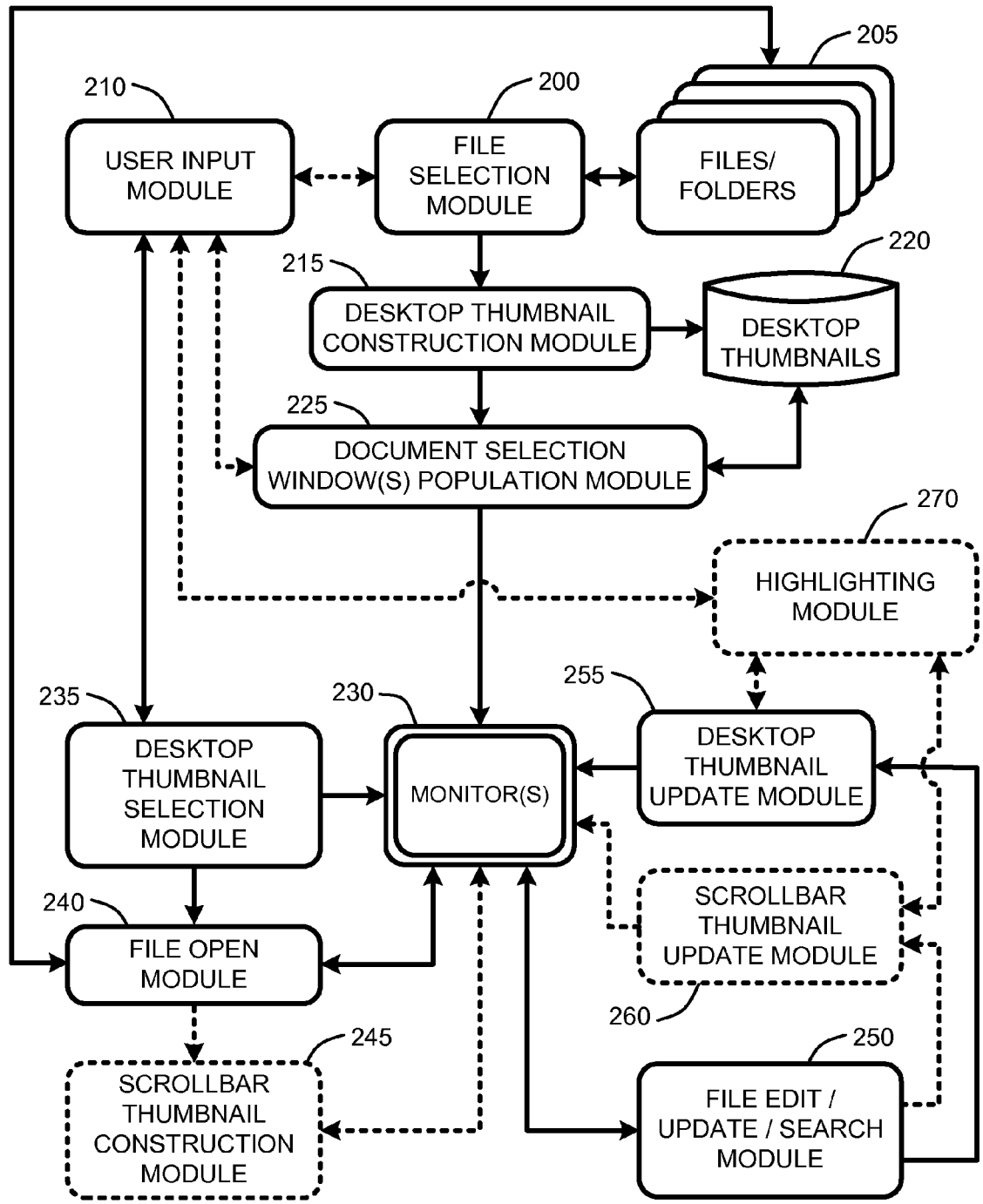
FIG. 2 illustrates an exemplary architectural system diagram showing exemplary program modules for implementing the Spatial Navigator.

2.2 System Architectural Overview:

The processes summarized above are illustrated by the general system diagram of FIG. 2. In particular, the system diagram of FIG. 2 illustrates the interrelationships between program modules for implementing the Spatial Navigator, as described herein. It should be noted that any boxes and interconnections between boxes that are represented by broken or dashed lines in FIG. 2 represent alternate embodiments of the Spatial Navigator described herein, and that any or all of these alternate embodiments, as described below, may be used in combination with other alternate embodiments that are described throughout this document.

In general, as illustrated by FIG. 2, the Spatial Navigator generally begins operation by using a file selection module 200 to select one or more files and/or folders 205 from a set of available files and folders. In one embodiment, selection of files and/or folders 205 is performed automatically by the file selection module 200. However, in one embodiment, one or more of these files and/or folders 205 are selected via a user input module 210.

Once the files and/or folders 205 have been selected, a desktop thumbnail construction module 215 generates a scaled version of each corresponding file and provides these scaled versions (representing desktop thumbnails 220) to a document selection window population module 225. The document selection window population module 225 then automatically arranges the desktop thumbnails 220 within a document selection window provided on one or more monitors 230 or other display devices. Further, in one embodiment, the user input module 210 allows the user to rearrange or move one or more of the desktop thumbnails 220 around the document selection window provided on the one or more monitors 230, and the user's arrangement of the desktop thumbnails is persisted between instances of the document selection window.

Once the document selection window has been populated with desktop thumbnails 220 by the document selection window population module 225, a desktop thumbnail selection module 235 allows user selection and interaction with the desktop thumbnails 220 via the user input module 210.

When the user selects a desktop thumbnail 220 via the desktop thumbnail selection module 235 and the user input module 210, a file open module 240 automatically opens the file corresponding to the selected desktop thumbnail, and jumps to a position within the opened file corresponding to a user selected point in the corresponding desktop thumbnail. The opened file is then displayed for editing and/or viewing on the one or more monitors 230. In addition, in one embodiment, a scrollbar thumbnail construction module generates a scaled version of the opened file and places this scaled version (representing a scrollbar thumbnail) adjacent to the opened file on the one or more monitors 230.

Once the file has been opened by the file open module 240, the open file may then be modified, searched, updated, etc., via a file edit/update/search module 250. Any changes to a file (including editing, searching, or other updates as described in Section 3) are automatically reflected and/or highlighted in any corresponding desktop thumbnails 220 and scrollbar thumbnails. In particular, a desktop thumbnail update module 255 provides real-time dynamic updating to desktop thumbnails 220 such that any changes to the underlying file are immediately reflected in the corresponding desktop thumbnail. Similarly, a scrollbar thumbnail update module 260 provides real-time dynamic updating to the scrollbar thumbnail corresponding to the currently open file such that any changes to that file are immediately reflected in the corresponding scrollbar thumbnail.

In addition, in one embodiment, as described below, both the desktop thumbnail module 255 and the scrollbar thumbnail update module 260 act in cooperation with a highlighting module 270 to dynamically highlight particular elements of desktop thumbnails 220 and scrollbar thumbnails.

In particular, as discussed in further detail in Section 3.5, in various embodiments, portions or elements of either or both the desktop thumbnails and the scrollbar thumbnails are highlighted, either directly, or via popups, callouts, changing text size, etc., to emphasize particular elements corresponding to the original documents. As discussed in Section 3.5, highlighted elements include search results, keywords, chapter names, section identifiers, method names, etc. In any case, the highlighting of the desktop thumbnails and the scrollbar thumbnails is accomplished by using the highlighting module 270, acting via either the desktop thumbnail module 255 or the scrollbar thumbnail update module 260, to highlight particular elements within the desktop thumbnails and the scrollbar thumbnails.

3.0 Operation Overview:

The above-described program modules are employed for implementing the Spatial Navigator described herein. As summarized above, this Spatial Navigator provides a system and method that uses spatial memory and perceptual cues that help users to stay oriented with respect to one or more documents, and to help those users in effectively navigating through and between those documents. The following sections provide a detailed discussion of the operation of the Spatial Navigator, and of exemplary methods for implementing the program modules described in Section 2.

3.1 Operational Details of the Spatial Navigator:

The following paragraphs detail specific operational embodiments of the Spatial Navigator described herein. In particular, the following paragraphs describe an overview of desktop and scrollbar thumbnails; desktop thumbnail population and arrangement within dynamic document selection windows; tabbed document selection windows; desktop and scrollbar thumbnail animations and highlighting; and a multi-display implementation of the Spatial Navigator.

3.2 Desktop and Scrollbar Thumbnails:

In general, both desktop thumbnails and scrollbar thumbnails represent scaled versions of an actual document. In both cases, the entire document is represented by the corresponding desktop or scrollbar thumbnail without the need for the user to scroll to see the entire document. As such, the user is provided with an overview of the entire document via the desktop or scrollbar thumbnail. Given the length of typical documents, the scaling of the document for generating desktop or scrollbar thumbnails typically makes the text within such desktop or scrollbar thumbnails too small for the user to read.

However, the point of both the desktop thumbnails and the scrollbar thumbnails is not to provide a user-readable scaled copy of the document, but to provide a scaled copy wherein the user can recognize formatting or other visual cues (code shape, brackets, target labels, etc.) for quickly navigating documents by selecting specific portions of a document via the corresponding desktop or scrollbar thumbnail.

In other words, these desktop and scrollbar thumbnails are intended to allow users to form a spatial memory of the underlying documents so that they can quickly access any desired portion of the document via the corresponding desktop or scrollbar thumbnail without the need to scroll through the document or otherwise unnecessarily search the document to find a desired location within the document.

3.2.1 Desktop Thumbnails:

As noted above, desktop thumbnails represent a scaled version of a corresponding document. Further, each of the desktop thumbnails is drawn to the same scale so that the user can see the relative size (length and width) of each file at a glance. In particular, the same font size is used for all desktop thumbnails generated for display within the document selection window. Consequently, the height of each desktop thumbnail is directly proportional to the corresponding length of the file (in terms of number of lines in the file), while the width of the desktop thumbnail is directly proportional to the length of the longest non-wrapped line section in the file. In one embodiment, key information is shown in a larger font to make it readily visible. For example, if the document is source code, method and class names would be highlighted by their size. Another example is that documents with chapter or section names would have those chapter or section names highlighted by their size. Note that animations and highlighting relating to document thumbnails and scrollbar thumbnails are discussed in further detail in Section 3.5.

Further, also as discussed above, desktop thumbnails provide the user with the capability to select and navigate between files. For example, in one embodiment, desktop thumbnails corresponding to open documents are highlighted (using any combination of color, borderline thickness, and/or shading) to indicate that the corresponding file is currently open. Similarly, in a related embodiment, desktop thumbnails corresponding to closed documents are shown either as partially transparent or as "grayed out."

Figure 3:
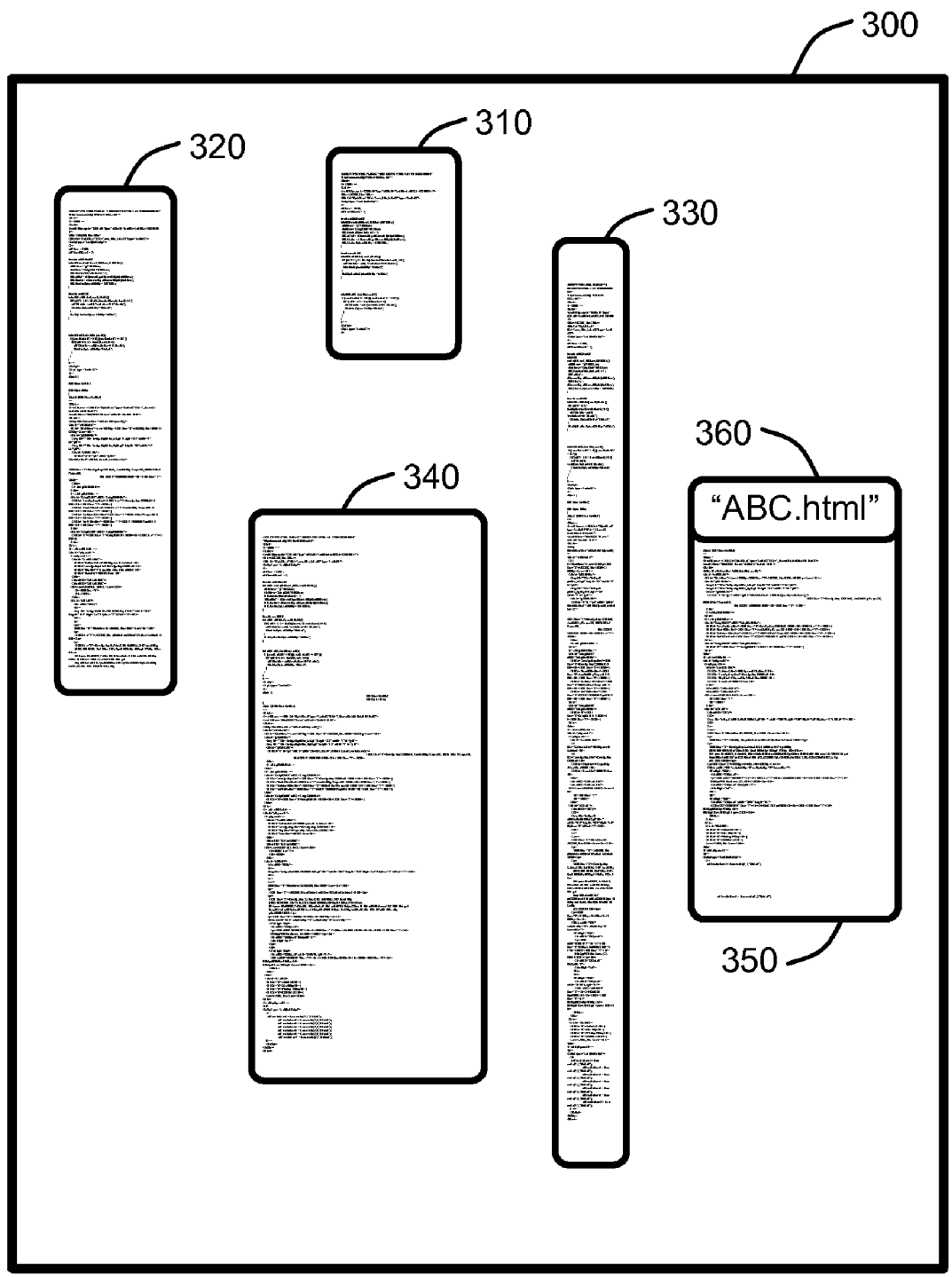
FIG. 3 illustrates an exemplary document selection window for displaying scaled graphical representations of documents for enabling various embodiments of the Spatial Navigator.

As illustrated by FIG. 3, a document selection window 300 provided by the Spatial Navigator provides desktop thumbnails (310, 320, 330, 340 and 350) represented by scaled images of a plurality of documents arranged within the document selection window.

Further, in another embodiment, one or more of the desktop thumbnails (310, 320, 330, 340 and 350) include a label 360, which shows the file name (e.g. "ABC.html"). In a related embodiment, the label 360 is displayed for any of the desktop thumbnails (310, 320, 330, 340 and 350) upon mouse-over or hover of a pointing device over one of the desktop thumbnails.

In general, the desktop thumbnails (310, 320, 330, 340 and 350) are automatically arranged within the document selection window 300. However, as described in further detail below, in one embodiment, the Spatial Navigator allows the user to arrange these desktop thumbnails within the document selection window using conventional drag and drop techniques. In this case, any part of the desktop thumbnail (310, 320, 330, 340 and 350), including the label 360, may be used as a handle for moving the desktop thumbnails.

In various embodiments, moving the cursor over a desktop thumbnail will perform any of several actions. For example, in one embodiment, if the desktop thumbnail represents software code, moving the cursor over the desktop thumbnail will generate a "pop-up" when the cursor moves over a portion of the desktop thumbnail corresponding to a program label (such as, for example, a method name) of that software code. Such pop-ups can include either a larger (user readable) title of the label or all or part of the software code corresponding to that label. Further, in a closely related embodiment, as soon as the mouse cursor enters the desktop thumbnail area, labels appear showing the names of likely navigation targets. In the case of software code, such targets may include the names of second-level items with no children (e.g., enums), third-level items (fields and methods), etc.

In addition, selecting or clicking on a desktop thumbnail will automatically activate an editor assigned to the corresponding document and automatically scroll to the part of the document corresponding to the location where the user clicked on the desktop thumbnail. In other words, selecting a desktop thumbnail will cause the corresponding file to be opened for further user interaction. In a related embodiment, selecting or clicking on a desktop thumbnail's title area (such as label 360 of FIG. 3) will activate the document's editor without scrolling the document.

Further, as noted above, both the desktop thumbnails and scrollbar thumbnails provide a "live" or real-time version of the corresponding document. Consequently, in one embodiment, the Spatial Navigator provides the capability to zoom into or otherwise expand a selected desktop thumbnail and to interact directly with the original document via a large zoomed desktop thumbnail. Such interaction includes any actions that the user can perform on the original document. In other words, this zooming embodiment allows the user to interact with the desktop thumbnail as if it were the original document.

3.2.2 Scrollbar Thumbnails:

In general, the scrollbar thumbnails are similar to the desktop thumbnails, both in terms of: 1) providing a scaled copy of the entire original document, and 2) allowing the user to navigate the document by selecting a particular point or portion of that document via direct interaction with the scrollbar thumbnail. However, unlike the desktop thumbnails, the scrollbar thumbnails are provided in a common window with the already opened document. As such, the scrollbar thumbnails are intended to provide the user with the capability to navigate within an already opened file or document.

In terms of scaling, the document represented by the scrollbar thumbnail is shrunk to fit the height of the scrollbar in the display window of the open document. In one embodiment, the width of the scrollbar thumbnail is proportional to the length of the longest line in the original document. However, in one embodiment, the Spatial Navigator allows the user to resize the width of the scrollbar thumbnail, as desired while keeping the height equal to the height of the scrollbar thumbnail equal to the height of the scrollbar in the display window of the open document. In one embodiment, when an open file is relatively short, the size of the text within the scrollbar thumbnail is capped at some nominal maximum size (such as, for example, a 2 point font size). As a result, the text within the scrollbar thumbnail is just below the threshold of readability. Again, it is intended that text shape (and other visual cues) be used to provide visual navigation landmarks (a perceptual activity) without actually reading the text (a cognitive activity).

In still another embodiment, the currently visible portion of the actual document (within the editor/viewing window) is also reflected by highlighting the corresponding portion of the scrollbar thumbnail (using color, shading, and/or a box drawn around the corresponding content within the scrollbar thumbnail.

In another embodiment, collapsible text (that is, text parsed into a tree with collapsible nodes), such as code presented in the folding editor window of a Microsoft® Visual Studio® project, is reflected in the scrollbar thumbnail with brackets representing the second- and third-level nodes, which are typically types and their members. These brackets provide another form of visual landmark for quickly navigating the corresponding file.

Further, as with the desktop thumbnails, the scrollbar thumbnails are active in that they present a "live" or real-time version of the corresponding document. Consequently, as with the desktop thumbnails, in various embodiments, moving the cursor over a scrollbar thumbnail will perform any of several actions. For example, in one embodiment, if the desktop thumbnail represents software code, moving the cursor over the scrollbar thumbnail will generate a "pop-up" when the cursor moves over a portion of the scrollbar thumbnail corresponding to a program label (such as, for example, a method name) of that software code. Such pop-ups can include either a larger (user readable) title of the label or all or part of the software code corresponding to that label. Further, in a closely related embodiment, as soon as the mouse cursor enters the scrollbar thumbnail area, labels appear showing the names of likely navigation targets. In the case of software code, such targets may include the names of second-level items with no children (e.g., enums), third-level items (fields and methods), etc.

Figure 4:
FIG. 4 illustrates an exemplary document editing/viewing window showing an interactive scaled graphical representation of the entire document adjacent to the original document for enabling various embodiments of the spatial navigator.

As noted above, the scrollbar thumbnail is provided in a common window with the corresponding open document. For example, as illustrated by FIG. 4, in one embodiment, when a document or file is opened by selection of the corresponding desktop thumbnail (see discussion in Section 3.2.1), the editor window 400 will display an editable/viewable version of a portion of the original document (whatever will fit within that window 400). In addition, a scaled version 410 of the entire document (i.e., the scrollbar thumbnail) is also displayed adjacent to a scrollbar associated with the window 400. Document navigation is then enabled by either selecting any portion of the scrollbar thumbnail 410, or by using the optional conventional scrollbar 420. In particular, as with the desktop thumbnail, selection of any portion of the scrollbar thumbnail 410 will immediately cause the editor/viewer window 400 to jump to the corresponding location in the original document.

Further, in yet another embodiment, the scrollbar thumbnail can be used without a conventional scrollbar 420. In addition, in one embodiment, the Spatial Navigator allows the user to close or hide either the scrollbar 420, or the scrollbar thumbnail 410, as desired.

3.3 Desktop Thumbnail Population and Arrangement:

In general, desktop thumbnail population and arrangement within dynamic document selection windows is performed automatically given a set of one or more files. Selection of the files to be used for construction of the desktop thumbnails is accomplished using combinations of various embodiments.

For example, in one embodiment, selection of the files to be used for construction of the desktop thumbnails is based on a recently accessed file list. In this embodiment, some user specified or predefined number n of the most recently accessed files are used to construct the desktop thumbnails that are then used to populate the document selection window.

In another embodiment, selection of the files to be used for construction of the desktop thumbnails is derived from the contents of one or more user selected folders or directories. In this embodiment, either all files within a folder, or some subset of those files (limited by size, type, date, etc.) are used to construct the desktop thumbnails that are then used to populate the document selection window.

In yet another embodiment, a selection of related files is used for construction of the desktop thumbnails. For example, as is well known to those skilled in the art, with software code, there is often a plurality of linked or included files associated with a primary code file. Similarly, other types of documents also include collections of related or linked files. Such collections of files are often referred to as a project. Furthermore, each of the linked or included files may also have further linked or included files of their own. Therefore, in one embodiment, one or more of the files associated with a particular project or projects are used to construct the desktop thumbnails that are then used to populate the document selection window.

In a closely related embodiment, whenever the user opens any file associated with a particular project, the Spatial Navigator automatically populates the document selection window with desktop thumbnails corresponding to the opened file, and one or more of the related files associated with the same project as the opened file.

In yet another embodiment, selection of the files to be used for construction of the desktop thumbnails is derived from the results of a user initiated search. For example, when the user performs a search for files, such as a file name search, keyword search, date search, etc., the Spatial Navigator will use the results of the search in constructing the desktop thumbnails to be used to populate the document selection window. Further, since a typical search can potentially return a large number of files, those search results can be limited, if desired, to some maximum number for use in constructing the desktop thumbnails to be used to populate the document selection window.

Clearly, there are many methods for selecting the files to be used in constructing the desktop thumbnails for use in populating the document selection window. Regardless of how the files are selected, once the corresponding desktop thumbnails have been constructed, in one embodiment, the Spatial Navigator automatically arranges the desktop thumbnails in the document selection window. However, the user is then provided with the capability to arrange or position these desktop thumbnails using conventional drag and drop techniques, and the user's changes are preserved (or persisted) relative to subsequent instances of the document selection window.

In addition, in a related embodiment, the Spatial Navigator includes an automatic de-cluttering mode for making the document selection window more usable. For example, one way in which the Spatial Navigator de-clutters the document selection window is to scale the size of the desktop icons such that they will all fit within the document selection window without overlapping each other.

Further, in one embodiment, if a particular file has not been opened or otherwise accessed by a user for some predetermined amount of time (relative to the other files represented by desktop thumbnails) then the corresponding desktop thumbnail will be removed from the document selection window. In a related embodiment, desktop thumbnails for files that have not been recently opened or otherwise accessed by a user are faded in direct proportion to the amount of time that has passed. In other words, in this embodiment, desktop thumbnails are increasingly faded as a function of time if they have not been recently opened or otherwise accessed.

3.3.1 Document Selection Window for Displaying Desktop Thumbnails:

As noted above, the document selection window provided for displaying the desktop thumbnails is used to display a plurality of those desktop thumbnails. As a result, there may be too many desktop thumbnails to usefully display in a document selection window having a fixed size. Therefore, in one embodiment, the size of the window is increased as necessary to place all of the desktop thumbnails. In this embodiment, horizontal and/or vertical scrollbars are used to allow the user to pan around within the document selection window to view or select particular desktop thumbnails.

However, since the document selection window can potentially become very large if the file set used for construction of desktop thumbnails is sufficiently large, visual clues are provided in one embodiment to help the user quickly navigate to a particular portion of that window.

Figure 5:
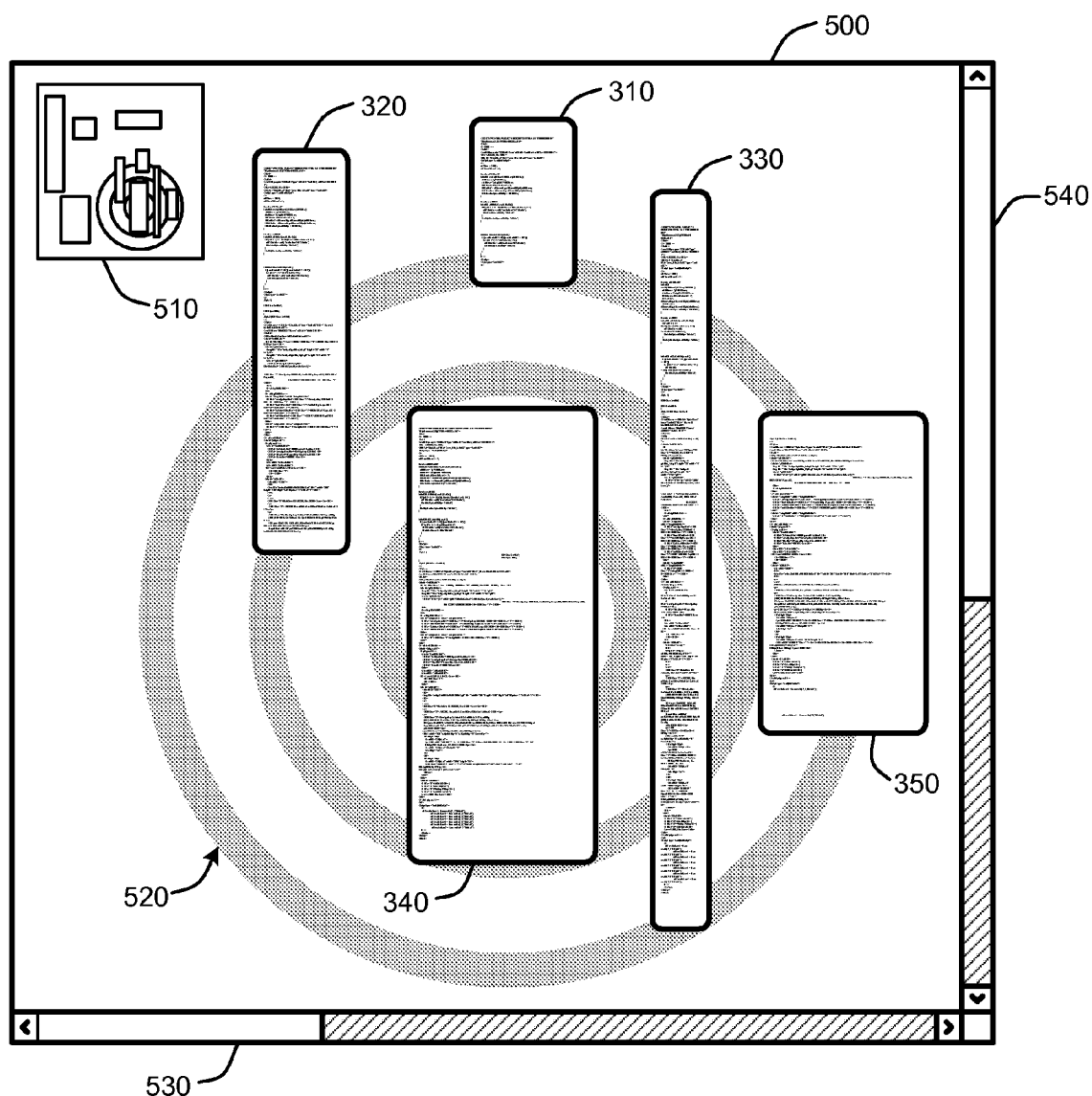
FIG. 5 illustrates an exemplary document selection window for displaying graphical representations of documents for enabling various embodiments of the Spatial Navigator.

For example, as illustrated by FIG. 5, when the document selection window 500 includes more desktop thumbnails (310, 320, 330, 340 and 350) than will fit within that document selection window, horizontal and or vertical scrollbars (530 and 540, respectively) allow the user to pan around the window. Further, in a related embodiment, an interactive overview window 510 is provided within the document selection window 500. This overview window 510 is always visible within the document selection window 500, regardless of whether or not the user scrolls the document selection window 500. In general, the overview window 510 provides a scaled view of the entire document selection window 500. Further, user selection of any point within the overview window 510 will cause the document selection window 500 to automatically scroll (horizontally and/or vertically) or jump to show the point selected within the overview window. In other words, selecting a point within the overview window 510 will automatically re-center document selection window 500 relative to the selected point.

Further, in another embodiment, other visual navigation cues are provided for further improving navigation within the document selection window 500. For example, in one embodiment, a visual indicator, such as, a target 520 or other shape, color, highlighting, etc., is placed on or under a desktop thumbnail corresponding to a currently opened file to show the user which file is currently open (or most recently opened in the case of multiple open files). Further, this visual indicator 520 is also represented in the overview window 510 so that the user can quickly return to the area of the last opened file, and so that the user will have a better perceptual understanding of the user's present position within the overall document selection window 500.

Finally, since the user may have multiple open windows at any given time, in alternate embodiments, the Spatial Navigator provides a hot key, an always visible button, or an application menu item that immediately shows or hides the document selection window with the desktop thumbnails upon user selection of the hot key, button, or menu item.

3.4 Tabbed Document Selection Windows:

As noted above, the document selection window provided for displaying the desktop thumbnails is used to display a plurality of those desktop thumbnails. As a result, there may be too many desktop thumbnails to usefully display in a document selection window having a fixed size. Therefore, in another embodiment, a set of tabbed document selection windows having a fixed size are provided to display separate sets of desktop thumbnails.

Figure 6:
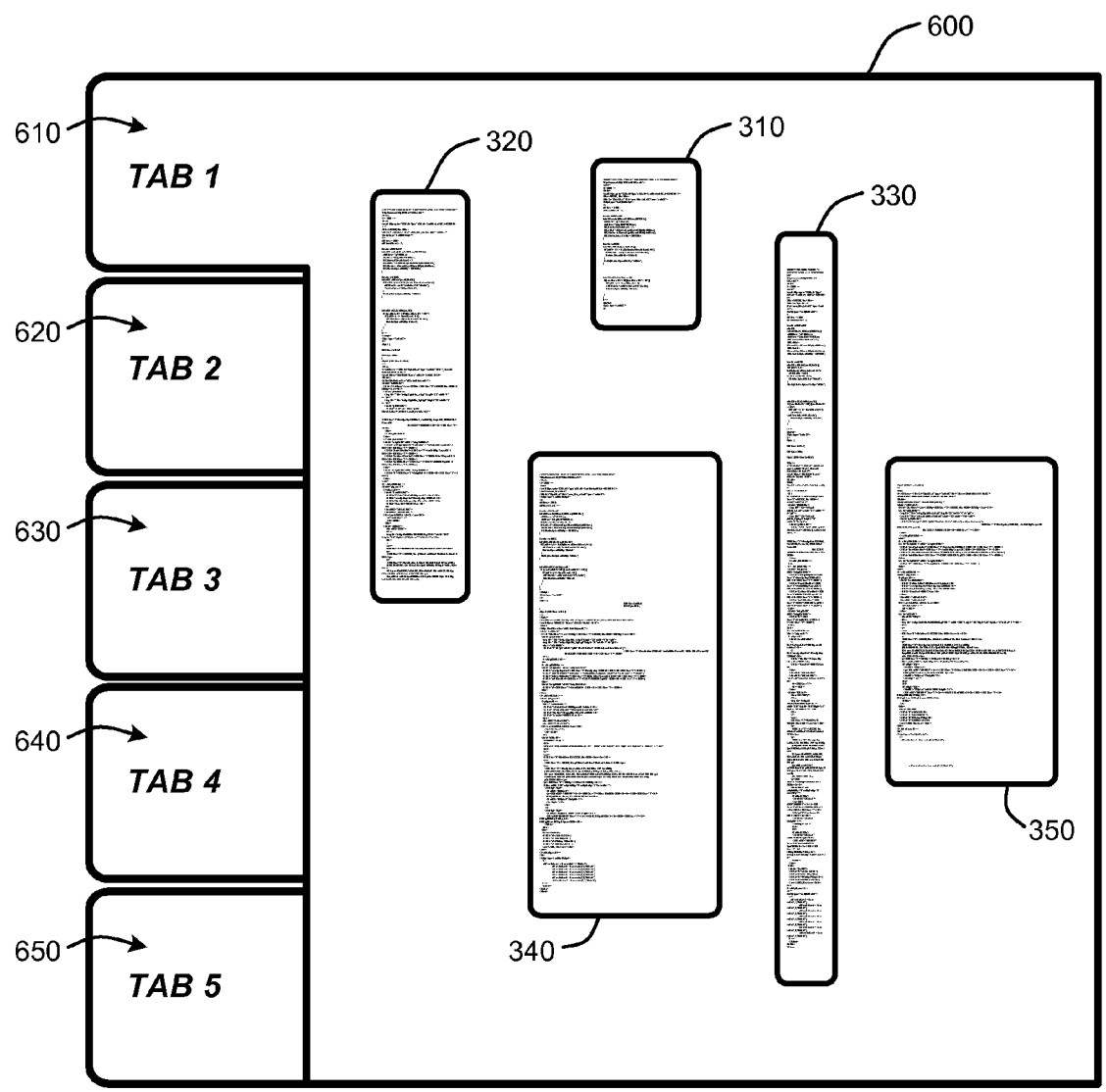
FIG. 6 illustrates an exemplary set of tabbed document selection windows for displaying scaled graphical representations of documents for enabling various embodiments of the Spatial Navigator.

For example, as illustrated by FIG. 6, a first set of desktop thumbnails (310, 320, 330, 340 and 350) are provided in a document selection window 600 corresponding to a first tab 610. A plurality of additional tabs (620, 630, 640, 650, etc.) provide user access to alternate populations of desktop thumbnails in alternate document selection windows.

As described above, there are many methods for selecting the files to be used in constructing the desktop thumbnails for use in populating the document selection window. For example, such methods include: the use of recently accessed file lists; the use of directory or folder contents; the use of sets of related files; the results of a user initiated search; etc. Any or all of these file selection techniques can be used to select the files used to construct the desktop thumbnails used to populate the various tabbed desktop.

For example, if the user has performed several recent searches, the results of each search may be provided in a different tabbed document selection window. Similarly, each tab may represent a different folder or directory. In addition, each tab may represent a different project (related files). Other examples include tabs that represent different sets of user selected or identified files. Any or all such file selection techniques may be combined to populate one or more of the tabbed document selection windows. Further, it should be noted that there it is not necessary to set a predefined limit on the number of tabs, as additional tabbed document selection windows can be automatically constructed as needed (with the corresponding tabs being scaled to fit the available space).

In addition, each tab (610, 620, 630, 640, 650, etc.) can have a title, either on the tab, or within the corresponding document selection window, to provide the user with an indication of what files are represented by the corresponding document selection window. For example, in the case of a search, the title may include the search parameters. Similarly, where the document selection window includes a folder or directory, the title may include the name of the folder or directory, or the complete drive path pointing to that folder or directory.

3.5 Animations and Highlighting:

As noted above, the desktop thumbnails and scrollbar thumbnails provide live or real-time representations of the entire document that they represent. Therefore, in some cases it is useful to highlight particular elements of a file by highlighting a corresponding point within the associated desktop thumbnail or scrollbar thumbnail.

For example, various useful animations provided for either or both the desktop thumbnail or scrollbar thumbnail include the use of pop-ups or the like for alerting the user to potentially useful navigation targets relative to the underlying file or document. As described above, examples of these pop-ups include providing user-readable pop-ups when a cursor moves over a portion of the desktop or scrollbar thumbnail corresponding to a program labels or other likely navigation targets.

Similarly, since the text within the desktop and scrollbar thumbnails is generally too small for the user to read (unless zooming in using one of the above-described embodiments), search results are highlighted in corresponding desktop thumbnails and/or scrollbar thumbnails. In various embodiments, this highlighting takes the form of using color or shading to highlight search results within the corresponding desktop and/or scrollbar thumbnails, providing pop-ups or callouts, showing the search results in larger user readable text, or some combination of these highlighting techniques. In any case, user selection of any highlighted text in a desktop thumbnail or scrollbar thumbnail will cause an immediate jump to the corresponding location in the corresponding file or document.

One advantage of this highlighting with respect to the desktop thumbnails is that the user can immediately see relative locations of every instance of searched items within every document represented by desktop thumbnails. Further, since selection of any portion of a desktop thumbnail will provide immediate access to the corresponding content, the user can immediately access any desired specific instances of the identified keyword (or other searched item) within any corresponding document.

In related embodiments, key information in documents is shown in a larger font or an overlaying popup or the like within the corresponding desktop thumbnail and/or scrollbar thumbnail to make that information more readily visible. For example, if the document is source code, method and class names would be highlighted by increasing their size within the corresponding desktop thumbnail and/or scrollbar thumbnail. Other examples involving increasing font size within desktop thumbnails and/or scrollbar thumbnails is that documents with chapter or section names would have those chapter or section names highlighted by increasing their size relative to the text in the remainder of the desktop and/or scrollbar thumbnail. Clearly, types of key information to be emphasized or highlighted within desktop thumbnail and/or scrollbar thumbnails depends upon the type or content of the corresponding document. However, in various embodiments, the types of key information to be highlighted are either predefined based on file types, or user defined for one or more file types.

In another embodiment, one or more of the desktop thumbnails are highlighted or animated to indicate how recently such files were accessed by the user. Such highlighting can be used to form a kind of "heat map" where more recently opened or accessed files are brighter, and files that are less recently opened or accessed are dimmer or otherwise faded.

In another related embodiment, the desktop thumbnails are color coded, or otherwise shaded or outlined using specific colors, shading, or outlines (or any combination of these methods) to indicate specific recent activities. For example, in the case of color coding, specific colors are used to indicate specific recent activities relative to each file. Such activities may include whether a file was last viewed, opened, edited, copied, etc., with a different color being used to reflect each specific activity. In one embodiment, to help the user to understand this type of color coding, a simple color code/activity key is provided within the document selection window to alert the user as to the type of action that was performed on individual files/folders corresponding to the particular desktop thumbnails. Similar keys are displayed in the case of using shading and/or outlines.

3.6 Multi-Display Implementations:

The use of multiple monitors or displays is becoming increasingly common, especially with respect to large projects such as software programming tasks. Consequently, in one embodiment, a multi-display implementation is provided wherein the document selection window for displaying desktop icons is always visible on one screen or display, and an editor/viewer window is provided on a second screen. As soon as any desktop thumbnail is selected on the first screen, the corresponding file or document is opened to the corresponding location on the second screen.

The foregoing description of the Spatial Navigator has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Spatial Navigator. It is intended that the scope of the invention be limited not by this detailed description, but rather by the claims appended hereto.

What is claimed is:

1. A system for providing inter-file navigation comprising:
    means for selecting a plurality of files;
    wherein contents of one or more of the plurality of files have different lengths and widths relative to lengths and widths of contents of one or more other files of the plurality of files;
    means for constructing a scaled graphical representation for each selected file, wherein each scaled graphical representation provides a graphical representation of the entire corresponding file;
    wherein an amount of scaling used to construct each graphical representation is consistent such that the resulting size of each graphical representation relative to the size of each other graphical representation visually indicates both the relative length and width of contents of each corresponding file;
    means for displaying an arrangement of the scaled graphical representations of the files within at least one document selection window;
    means for providing a user interface for user selection of any point within any of the scaled graphical representations of the files displayed in the at least one document selection window;
    within a user interface (UI) window, means for opening a file corresponding to a selected one of the scaled graphical representations selected via the user interface; and
    means for automatically scrolling the opened file to a position corresponding to the point selected within the scaled graphical representations of the file.

2. The system of claim 1 wherein a scaled graphical representation of the entire open file is placed adjacent to the open file in the UI window.

3. The system of claim 2 further comprising selecting a point within the scaled graphical representation adjacent to the opened file and automatically scrolling the opened file to a position corresponding to that selected point.

4. The system of claim 1 wherein selecting the plurality of files comprises selecting one or more file directories.

5. The system of claim 1 wherein selecting the plurality of files comprises selecting all files identified as including one or more matches to a user defined search query.

6. The system of claim 5 wherein the scaled graphical representations of the files displayed in the document selection window are further modified to highlight results of the user defined search query.

7. The system of claim 1 wherein the at least one document selection window is represented by a set of tabbed user selectable document selection windows, and wherein each tabbed document selection window provides a different set of scaled graphical representations corresponding to different sets of selected files.

8. A computer storage medium having computer executable instructions for providing user selection among a plurality of electronic documents, said computer executable instructions comprising:
    selecting at least one set comprising a plurality of electronic files; wherein contents of one or more of the plurality of the electronic files have different lengths and widths relative to the lengths and widths of contents of one or more other files of the plurality of electronic files;
    for each selected file, generating an image representing a scaled version of the entire corresponding file; wherein an amount of scaling used to construct each image is consistent such that the resulting size of each image relative to the size of each other image visually indicates both the relative length and width of contents of each corresponding file; populating a display window with the images;

via a user interface, selecting any point within any of the images within the display window;

within a user interface window, opening the electronic file corresponding to the image having a point selected via the user interface; and automatically scrolling the opened electronic file to a position corresponding to the point selected via the user interface.

9. The computer executable instructions of claim 8 further comprising:

automatically constructing a scaled graphical representation of the entire opened electronic file;

positioning the scaled graphical representation of the entire opened electronic file within the user interface window holding the opened electronic file; and navigating within opened electronic file by automatically scrolling to any position in the opened electronic file corresponding to any point selected within the scaled graphical representation of the entire opened electronic file.

10. The computer executable instructions of claim 9 wherein positioning the scaled graphical representation of the entire opened electronic file within the user interface window holding the opened electronic file comprises placing that scaled graphical representation as a visible background image relative to the opened electronic file.

11. The computer executable instructions of claim 10 further comprising dynamically modifying the images within the display window to highlight results of a search query.

12. The computer executable instructions of claim 8 wherein the display window comprises a set of tab-selectable document selection windows, and wherein each tab-selectable document selection window displays a different set of images generated from different sets of electronic files.

13. The computer executable instructions of claim 12 wherein each tab-selectable document selection window displays a different set of electronic files corresponding to different user defined projects.

14. The computer executable instructions of claim 8 further comprising dynamically modifying the images within the display window to highlight potential navigation targets in the corresponding electronic file.

15. The computer executable instructions of claim 14 wherein the highlighting includes any one or more of:

increasing text size of one or more potential navigation targets;

changing text color of one or more potential navigation targets;

using popups to highlight one or more potential navigation targets; and using callouts to highlight one or more potential navigation targets.

16. The computer executable instructions of claim 14 wherein if any highlighting is included within any image within the display window, then corresponding highlighting is included within any corresponding opened electronic file.

17. A method for selecting electronic files comprising:

populating a document selection window rendered on a display device with a plurality of scaled graphical representations of corresponding electronic files;

wherein contents of one or more of a plurality of the electronic files have different lengths and widths relative to lengths and widths of contents of one or more other files of the plurality of electronic files;

wherein an amount of scaling used to construct each graphical representation is consistent such that the resulting size of each graphical representation relative to the size of each other graphical representation visually indicates both the relative length and width of contents of each corresponding electronic file;

selecting any point within any of the scaled graphical representations of the electronic file;

within a user interface window, opening the electronic file corresponding to the selected point; and automatically scrolling the opened electronic file to a position corresponding to the selected point.

18. The method of claim 17 further comprising highlighting at least one potential navigation target in one or more of the scaled graphical representations of corresponding electronic files.

19. The method of claim 18 wherein the potential navigation targets include any one or more of:

matches to one or more search queries;

electronic file chapter names;

electronic file chapter numbers;

electronic file section identifiers;

software code method names;

software code class names; and keywords.

20. The method of claim 17 further comprising:

positioning a scaled graphical representation of the entire opened electronic file within the user interface window holding the opened electronic file; and navigating within opened electronic file by automatically scrolling to any position in the opened electronic file corresponding to any point selected within the scaled graphical representation of the entire opened electronic file.

* * * * *